United States Patent [19]

Suto et al.

[11] 4,367,085
[45] Jan. 4, 1983

[54] METHOD OF FABRICATING MULTI-MODE OPTICAL FIBER PREFORMS

[75] Inventors: Shoichi Suto; Fumiaki Hanawa; Masao Kawachi; Takao Edahiro; Motohiro Nakahara, all of Mito, Japan

[73] Assignee: Nippon Telegraph & Telephone Public Corporation, Tokyo, Japan

[21] Appl. No.: 188,916

[22] Filed: Sep. 19, 1980

[30] Foreign Application Priority Data

Jan. 7, 1980 [JP] Japan ................................. 55/33
Jan. 7, 1980 [JP] Japan ................................. 55/34

[51] Int. Cl.³ ..................... C03B 19/06; C03B 37/07
[52] U.S. Cl. ................................. 65/18.2; 65/3.12
[58] Field of Search ................. 65/3.12, 18.2, 32

[56] References Cited

U.S. PATENT DOCUMENTS 4,062,665 12/1977 Izawa et al. ................... 65/3.12
4,259,101 3/1981 Tsukuda et al. ................ 65/3.12

FOREIGN PATENT DOCUMENTS 2625064 3/1977 Fed. Rep. of Germany ....... 65/3.12
54-103058 8/1979 Japan ................................ 65/3.12
54-134129 10/1979 Japan ................................ 65/3.12
54-134133 10/1979 Japan ................................ 65/3.12

OTHER PUBLICATIONS

Sudo et al., "Low OH–Content Optical Fiber . . . ", Electronic Letters, vol. 14, No. 17, Aug. 17, 1978, pp. 534-535.
Izawa et al., "Continuous Fabrication Process for High--Silica Fiber Preforms", The Transactions of the IECE of Japan, vol. E 62, No. 11, Nov. 1979, pp. 779-785.

Primary Examiner—Richard V. Fisher
Attorney, Agent, or Firm—Spencer & Kaye

[57] ABSTRACT

A method of fabricating an optical fiber preform wherein a synthesizing torch is inclined between 10° and 60° with respect to the rotation axis of a seed rod. Moving the rod while rotating it, a glass raw material gas and a flame forming gas are blown out individually from the torch to synthesize glass particles which are deposited onto one end of the rod, so that a cylindrical porous preform is grown in the direction of the rotation axis of the rod. Then the porous preform is heated at a high temperature to vitrify the porous preform into a transparent optical fiber preform. At least one exhaust port is disposed at a distance of 1 mm to 50 mm from the periphery of the porous preform and in the vicinity of the growing surface of the porous preform. In fabricating the porous preform the outer diameter fluctuations are small, and the preform is formed stably without formation of cracking on the periphery of the preform.

10 Claims, 20 Drawing Figures

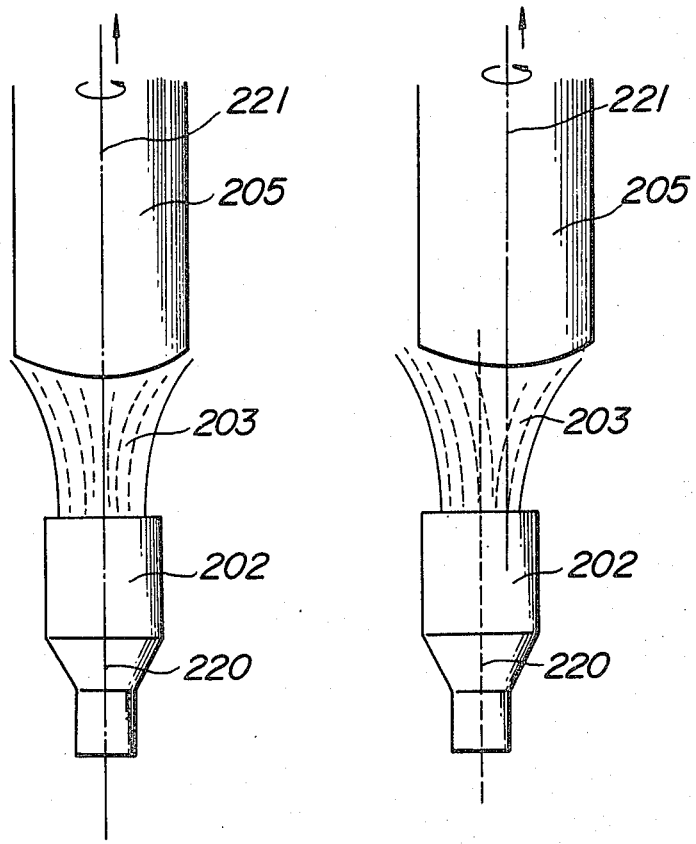

$\theta=0°$ $\theta=15°$ $\theta=30°$ $\theta=60°$

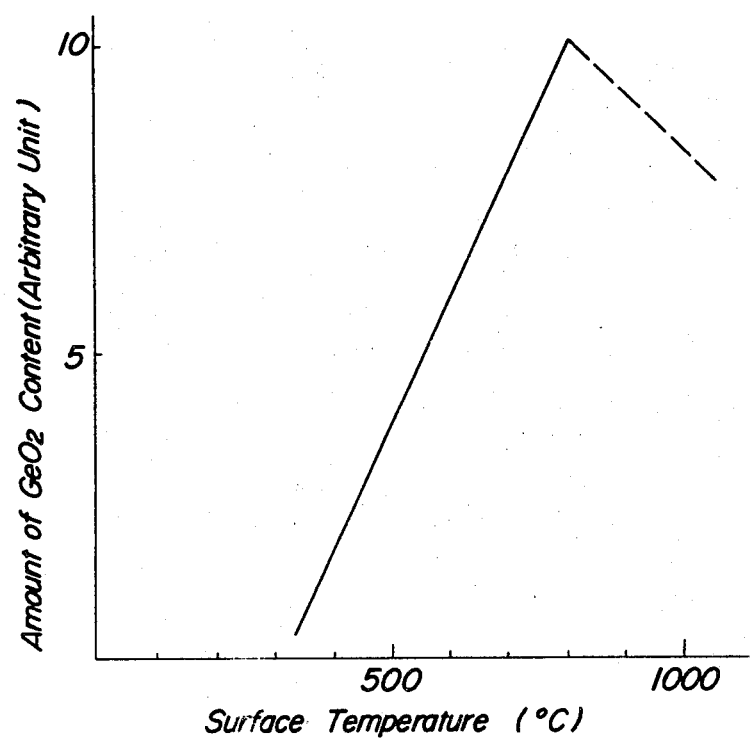

METHOD OF FABRICATING MULTI-MODE OPTICAL FIBER PREFORMS

BACKGROUND OF THE INVENTION

The present invention relates to a method of fabricating multi-mode optical fiber preforms by the VAD (Vapor-phase Axial Deposition) method. Reference is also made to copending application Ser. No. 188,914 filed by Kawachi et al on Sept. 19, 1980 and which relates to a method of fabricating single-mode optical fiber preforms.

The process for fabricating optical fiber preforms by the VAD method is disclosed in U.S. Pat. No. 4,062,665. In the VAD method, fine glass particles, synthesized by hydrolysis or the thermal oxidation reaction of glass raw material with a flame, are attached to and deposited on one end of a seed rod in the axial direction so as to form a cylindrical porous preform. The porous preform is heated at a high temperature and vitrified into a transparent preform.

In the conventional VAD method for fabricating a cylindrical porous glass preform, a glass synthesizing torch is disposed on or in parallel with the axis of rotation of the porous glass preform. Further, an exhaust nozzle for removing residual glass particles not attached to the growing surface of the porous glass preform is disposed on the side of a reaction vessel. In this case, the growing speed of the porous preform in the axial direction is likely to be slow and in an extreme case the growing speed is higher in the radial direction than in the axial direction. The residual glass particles are additionally attached to the periphery of the upper porous preform so that the outer diameter of the preform thus obtained greatly fluctuates. Because of this disadvantage of the conventional VAD method, it has been very difficult to improve the transmission bandwidth properties of a multi-mode optical fiber by controlling an obtained graded-type refractive index profile by adjusting the dopant concentration in the radial direction of the glass preform and to improve transmission loss properties by the simultaneous formation of core and cladding regions. For this reason, the conventional VAD method fails to take full advantage of the feasibility of mass-production of optical fibers which is a feature of the VAD method.

A different construction has been proposed in Electronics Letters, Aug. 17, 1978, Vol. 14, No. 17, pp. 534–535, by S. Sudo et al. In this construction, a main torch and a subsidiary torch are provided, the main torch being disposed on the rotation axis of the porous preform while the subsidary torch is inclined to the rotation axis. With this arrangement of torches, the glass particles from the subsidiary torch are deposited on the peripheral portion of the porous glass preform in a manner such that the refraction index profile in the radial direction of the preform is adjustable. This proposal, however, still involves the disadvantage of an undesirable outer diameter fluctuation of the porous glass preform making it difficult to stably manufacture long-length optical fibers by the VAD method.

Additionally, in those cases where the amount of residual glass particles is fairly large, a glass particle layer with a small apparent density is formed by the residual glass particles on the side wall of the porous preform. Accordingly, the outer diameter of the porous glass preform is remarkably large or "cracking" may be formed on the peripheral wall of the porous glass preform. As a result, after the preform is vitrified to obtain a transparent preform, it is difficult to use the vitrified preform as an optical fiber preform.

SUMMARY OF THE INVENTION

In view of the above, it is an object of the invention to provide a method for fabricating a multi-mode optical fiber preform by an improved VAD method whereby the above-mentioned disadvantages are overcome.

Another object of the invention is to provide a method of fabricating a multi-mode optical fiber preform in which a cylindrical porous preform may stably be grown in the axial direction with little fluctuation of its outer diameter.

Yet another object of the invention is to provide a method of fabricating a multi-mode optical fiber preform in which the fluctuation of the outer diameter of the porous preform is lessened and the above-mentioned glass particle layer with small apparent density is not formed on the periphery of the porous preform, so that a porous preform having a uniform outer diameter may be stably formed without the formation of cracks on the periphery of the porous preform.

Still another object of the invention is to provide a method of fabricating a multi-mode optical fiber preform in which the porous preform for the core of the optical fiber is stably grown in the axial direction with little fluctuation in the outer diameter and a cladding porous glass body is deposited on the periphery of the porous preform for the core to form a low-loss optical fiber preform.

A further object of the invention is to provide a method for fabricating an optical fiber preform suitable for manufacturing a multi-mode optical fiber having a long-length and low-loss, in which a porous preform for a core having a large diameter is stably grown in the axial direction with little fluctuation in the outer diameter and without forming a glass particle layer having small apparent density on the periphery of the porous preform.

Still a further object of the invention is to provide a method of fabricating a multi-mode optical fiber preform for manufacturing graded-index optical fibers having a wide bandwidth and low-loss by controlling the refractive-index profile of the porous preform.

According to a first aspect of the present invention, a seed rod is moved while being rotated, and a synthesizing torch inclined by 10° to 60° relative to the rotation axis of the seed rod individually blows out glass raw materials. The environment gas and flame stream include high temperature gas. The glass raw materials are synthesized into glass particles through hydrolysis by flame or thermal oxidation by a high temperature heat source. The glass particles thus synthesized are blown and deposited at one end of the seed rod which moves continuously while rotating. In this way, a cylindrical porous preform is grown on the rotation axis of the seed rod and is heated at a high temperature so as to be vitrified into a transparent optical fiber.

According to a second aspect of the present invention, at least one exhaust port is disposed at a distance of 1 mm to 50 mm from the periphery of the porous preform and in the vicinity of the growing surface of the porous preform which is fabricated by the deposition of synthesized glass particles as mentioned above. The porous preform is fabricated while the exhaust port exhausts glass particles not attached to the growing surface of the porous preform, gases produced as a result of the hydrolysis or thermal oxidation, non-reacted glass raw materials and environmental gases.

In the present invention, it is preferable that the synthesizing torch be inclined by 10° to 60°, preferably by 30° to 40°, with respect to the rotation axis of the seed rod so that the glass particles are obliquely blown and deposited onto one end of the seed rod, and that the above-mentioned exhaust port is disposed at a distance of 1 mm to 50 mm, preferably of 5 mm to 10 mm, from the periphery of the porous preform.

In a preferred embodiment of the present invention, the synthesizing torch may be used as a torch for the core.

In another preferred embodiment of the present invention, the synthesizing torch may be used as a torch for the core, the cylindrical porous glass preform may be used as a porous glass preform for the core, and a porous glass preform for cladding is deposited onto the periphery of the porous glass preform for the core by a torch for cladding.

BRIEF DESCRIPTION OF THE DRAWINGS

FIGS. 2A and 2B, 3A and 3B, 4A and 4B, and 5A and 5B are schematic diagrams for illustrating disadvantages of the conventional VAD method;

FIG. 8 is a graphical representation illustrating the surface temperature dependency on the $GeO_2$ content;

DETAILED DESCRIPTION OF PREFERRED EMBODIMENTS

Figure 1:
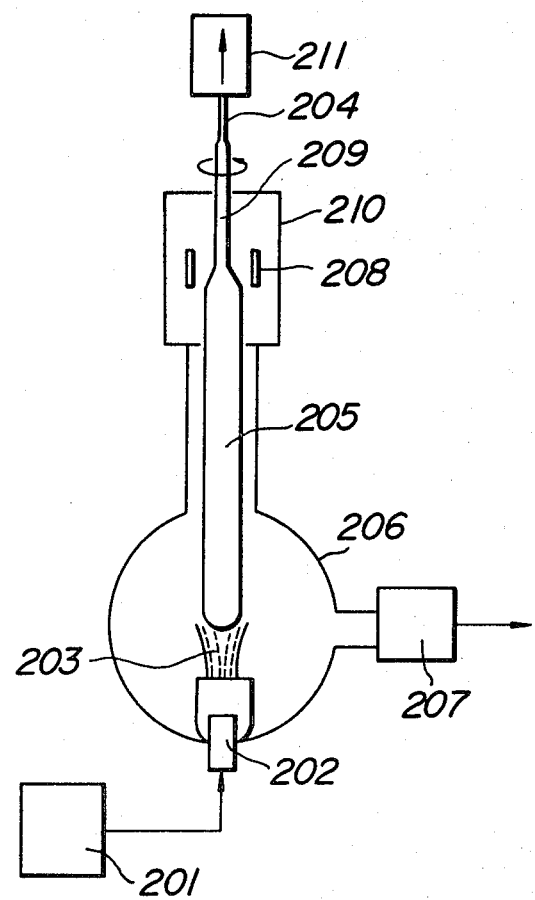
FIG. 1 is a schematic diagram showing an optical fiber preform fabricating apparatus by the conventional VAD method.

A method of fabricating optical fiber preforms by the conventional VAD method will be described with reference to FIG. 1. In FIG. 1, reference numeral 201 designates a supplier for supplying glass raw material gas and flame forming gas. The glass raw material gas may be, for example, silicon tetrachloride $SiCl_4$, germanium tetrachloride $GeCl_4$, boron trichloride $BCl_3$, phosphorous oxide trichloride $POCl_3$, phosphorus trichloride $PCl_3$, or boron tribromo $BBr_3$. The flame forming gas may be an atmospheric gas composed of a combustible gas such as $H_2$, an auxiliary gas such as $O_2$ and an inactive gas such as Ar, He or $N_2$. Those gases are individually supplied to a glass synthesizing torch 202. By individually blowing out those gases from the torch 202, fine glass particles such as silicon dioxide $SiO_2$, germanium dioxide $GeO_2$, boron oxide $B_2O_3$ or phosphorous oxide $P_2O_5$ are synthesized by a hydrolysis reaction or a thermal oxidation reaction. By blowing the fine glass particles thus synthesized and a flame stream 203 onto a seed rod 204, the fine glass particles are attached to and deposited on the seed rod 204 to form a porous preform 205 around the periphery of the seed rod 204. In FIG. 1, reference numeral 206 designates a reaction vessel. An exhaust rate controller 207 is provided for processing the glass raw material gas and the flame forming gas, which reside in the vessel 206, the fine glass particles not attached to the porous preform 205, and the gas resulting from the hydrolysis or the oxidation reaction such as $H_2O$, HCl, and $Cl_2$. The exhaust rate controller 207 transforms the $Cl_2$ gas into HCl by a water shower and neutralizes it by NaOH. The fine glass particles are washed away by the water shower. The porous preform 205 is heated at 1500° to 1700° C. by a ring heater 208 of an electric furnace provided on the upper part of the fabricating apparatus and is vitrified into a transparent preform 209. Reference numeral 210 designates a protecting vessel for the electric furnace. A pulling-up machine 211 pulls upwardly the seed rod 204, and thus the porous preform 205 growing on the seed rod 204 and the transparent preform 209, while rotating the seed rod 204.

In fabricating the porous preform 205 by using the conventional VAD method, as shown in FIG. 2A, the center axis 220 of the synthesizing torch 202 and the stream of the fine glass particles and the flame is coincident with a rotation axis 221 of the porous glass preform 205. Alternatively, the center axis 220 is shifted from the rotation axis 221 so that the axes are not coincident but are in parallel with each other, as shown in FIG. 2B.

Figures 3A, 3B:
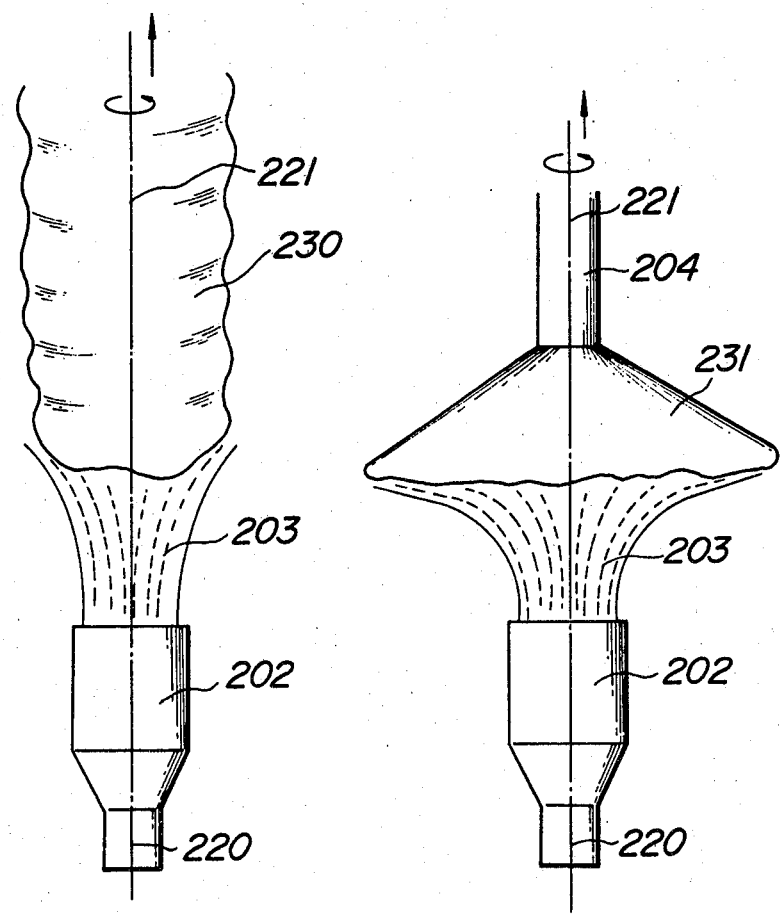

In fabricating the porous preform 205 with the synthesizing torch 202 disposed as shown in FIG. 2A or 2B, it is difficult to keep uniform the shape of the growing surface of the porous preform. For this reason, the outer diameter of the porous preform 230 greatly fluctuates as viewed in the longitudinal direction, as shown in FIG. 3A. Further, the growing speed of the porous preform in the axial direction is likely to be very slow. In an extreme case, the porous preform 231 grows more in the radial direction than in the direction of the rotation axis 221 as shown in FIG. 3B. This makes it difficult to fabricate a cylindrical porous preform.

Figure 4A:
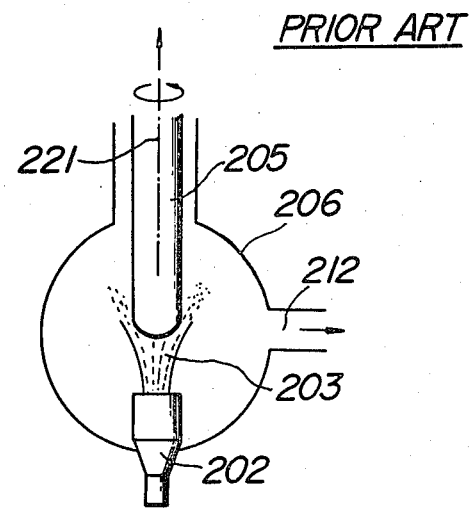
Figure 4B:
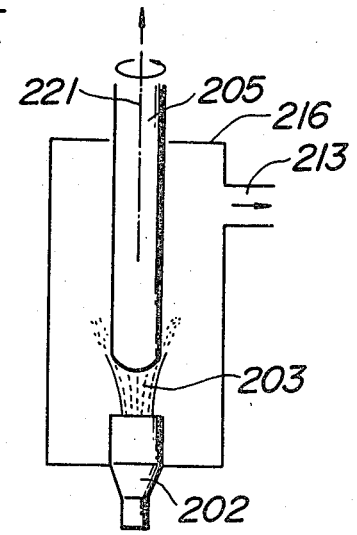

In order to guide undesired glass particles or undesired various gases produced within the reactor vessel 206 as a result of non-reaction or reaction to the exhaust rate controller 207, an exhaust port 212 may be formed through the spherical wall of the spherical vessel 206, as shown in FIG. 4A, or an exhaust port 213 is formed through the upper cylindrical wall of a cylindrical vessel 216, as shown in FIG. 4b.

Figure 5A:
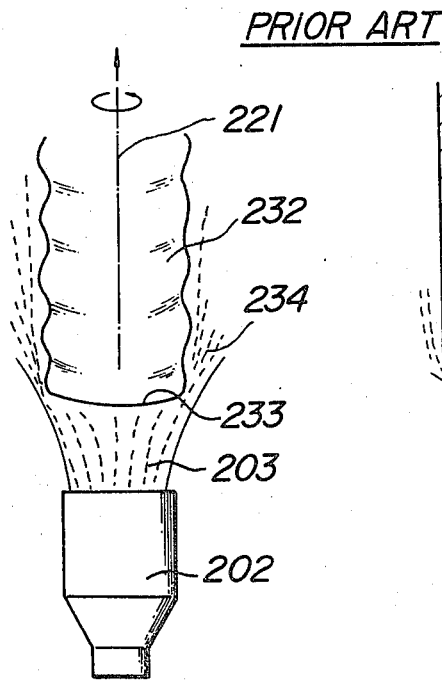
Figure 5B:
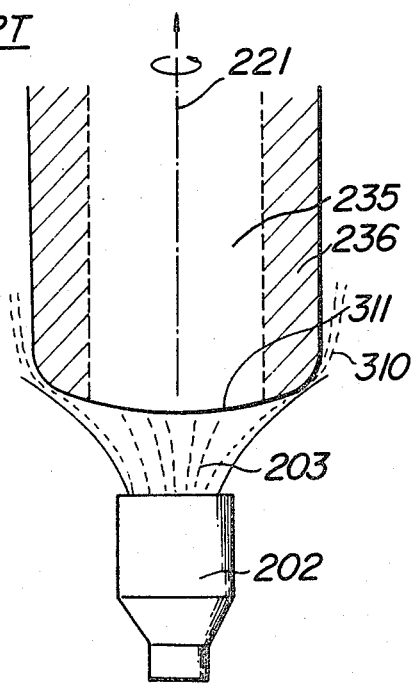

According to this conventional method, of the fine glass particles 203 synthesized and blown out by the synthesizing torch 202, residual fine glass particles 234 not attached to and disposed on the growing surface 233 of the porous preform 232, are again attached to the peripheral surface of the porous preform 232. As a result, the outer diameter of the porous preform 232 fluctuates between approximately ±2 to ±10 mm. When the amount of residual fine glass particles is large, a glass particle layer 236 having a small apparent density ranging from 0.05 to 0.1 $g/cm^3$ is formed on the peripheral surface of a normally formed porous preform 235 having an apparent density from 0.2 to 0.5 $g/cm^3$ by the residual fine glass particles, as shown in FIG. 5B. With the additional formation of the layer 236, the outer diameter of the porous preform 235 becomes extremely large and "cracking" is formed on the periphery of the porous preform 235. This makes it difficult to use the transparent vitrified preform as a multi-mode optical fiber preform.

In order to manufacture multi-mode optical fibers by a VAD method suitable for manufacturing a long-length optical fiber, various experiments were conducted. Through those experiments, it has been found that the abovementioned defects are effectively removed when the synthesizing torch is inclined with respect to the rotation axis of the porous preform and the exhaust port is disposed in the vicinity of the growing surface of the porous preform. This will be discussed in detail later.

Figure 6:
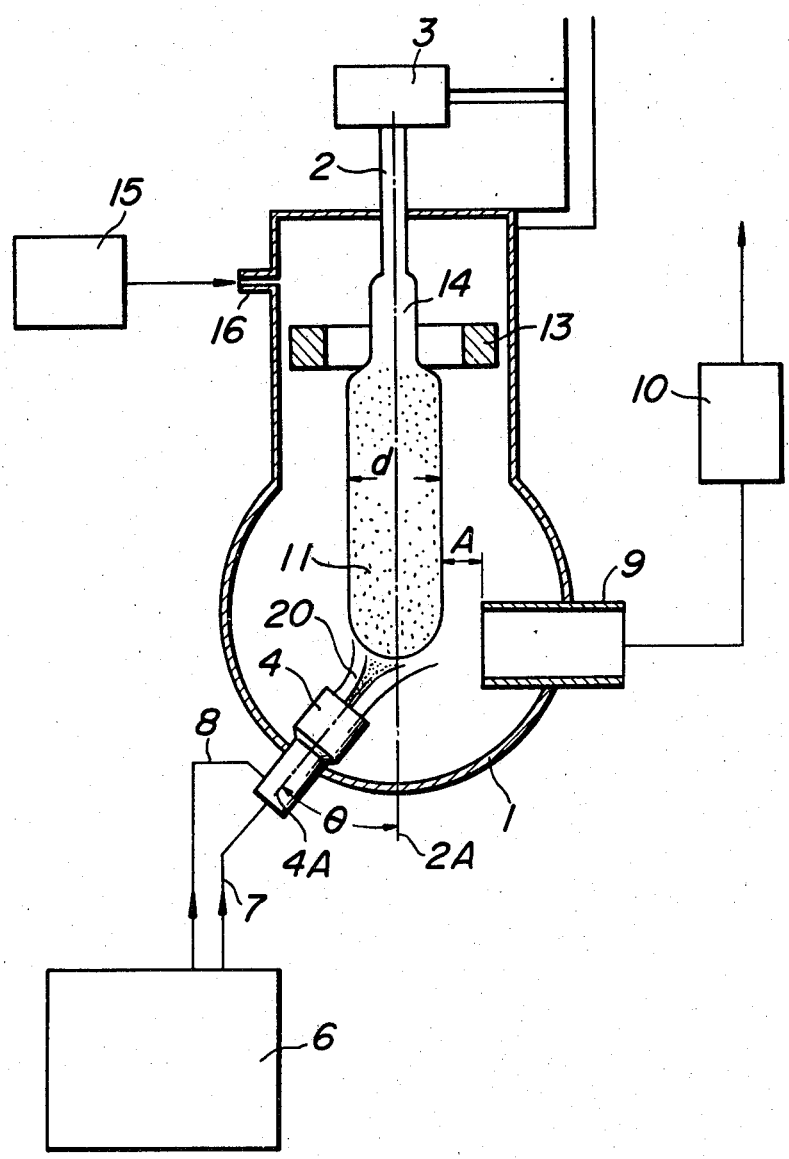
FIG. 6 is a schematic diagram showing an apparatus for fabricating optical fiber preforms according to the invention.

An example of a method for fabricating multi-mode optical fiber preforms according to the present invention will be described with reference to FIG. 6. In FIG. 6 which illustrates an embodiment of a fabrication apparatus for fabricating transparent glass preforms according to the present invention, reference numeral 1 denotes a reaction vessel, 2 a supporting rod as a seed rod onto which a porous glass body is attached and deposited, 3 a pulling-up machine for raising the support rod 2 while it is being rotated and 4 a synthesizing torch. The synthesizing torch is attached to the reaction vessel 1 in such a way that the central axis 4A of the synthesizing torch 4 is inclined with an angle $\theta \simeq 10°$ to 60° with respect to the axial direction 2A of the supporting rod 2. It is preferable that the inclination angle $\theta$ is adjustable. Details of the synthesizing torch 4 per se will be described later. The torch 4 is supplied by a supplier 6 with a glass raw material gas such as $SiCl_4$, $GeCl_4$, $POCl_3$ or $BBr_3$, an atmospheric gas such as Ar, He or $N_2$, a combustible gas such as $H_2$, and an auxiliary gas such as $O_2$, the latter three gases being generally referred to as flame forming gases. From the supplier 6, the glass raw material gas is supplied through a glass raw material gas pipe 7 to the torch 4, while at the same time the various flame forming gases are supplied to the torch 4 through flame forming gas pipes 8. Reference numeral 9 designates an exhaust port attached to the reaction vessel 1. Through the exhaust port 9, gas such as $H_2O$, HCl and $Cl_2$ caused by the hydrolysis or thermal oxidation of the flame blown out from the torch 4 in the reaction vessel 1, non-reacted glass raw material gas such as $SiCl_4$, $GeCl_4$, $POCl_3$, $BBr_3$ or the like and the atmospheric gas such as Ar, He or $N_2$ are exhausted to an exhaust gas cleaner 10 for processing.

Reference numeral 11 represents a porous preform deposited and grown on the support rod 2, 13 a ring heater for heating the porous preform 11, which is disposed passing through the ring heater 13, at 1500° C. to 1700° C. to vitrify and consolidate the porous preform 11 into a transparent preform 14, 15 a supplier for supplying halogen gas for dehydration gas treatment, for example, a mixture of He and $Cl_2$ gases, and 16 a supply port for supplying the dehydration gas into the reaction vessel 1.

In operation, the glass raw material gas containing for example, $SiCl_4$ as a major component and the flame forming gases are fed from the supplier 6 through the pipe 7 to the synthesizing torch 4. As a result, fine glass particles containing silicon dioxide $SiO_2$ as the major component and $GeO_2$ or $P_2O_5$ as a dopant are deposited on the end face of the supporting rod 2. The supporting rod 2 is moved upwardly while being rotated by the pulling-up machine 3, so as to grow the porous preform 11. Subsequently, the porous preform 11 is heated at, for example, 1500° C. by the consolidating heater 13, so that the transparent preform 14 is formed. In the consolidating step, the dehydration gas, for example, a mixture of He and $Cl_2$ gases is supplied from the supply port 16 into the reaction vessel 1, where the OH content is removed from the transparent preform 14.

With the view of reducing the outer diameter fluctuations of the growing porous preform 11, the present invention stabilizes the growth of the porous preform 11 in the axial direction with an arrangement such that the central axis 4A of the synthesizing torch 4 and the flame stream 20 is inclined by an angle $\theta$ with respect to the rotation axis 2A of the porous preform 11, as shown in FIG. 6.

By using the optical fiber preform fabricating apparatus shown in FIG. 6, the porous preform 11 was fabricated under a condition that the synthesizing torch 4 was supplied with oxygen gas at 10 l/min, hydrogen gas at 5 l/min and glass raw material gas (containing 90 mol % of $SiCl_4$ and 10 mol % of $GeCl_4$) at 0.3 l/min. In this fabrication process, the relationships shown in Table 1 were obtained between the angle $\theta$ and the fluctuations of the outer diameter d of preform 11.

TABLE 1

| Angle $\theta$ and fluctuations of outer diameter | |
|---|---|
| Angle $\theta$ (°) | Outer diameter fluctuation (mm) |
| 0 | 5–10 |
| 10 | 2–5 |
| 20 | 1–2 |
| 30 | 0.5–1 |
| 40 | 0.5 or less |
| 50 | 0.5–1 |
| 60 | 2–10 |
| 60 or more | Preform growth was impossible |

With the same supply of the glass raw material gas and combustible gas to the torch as in the above-mentioned case, the relationship shown in Table 2 was obtained between the angle $\theta$ and the growing speed of the porous preform in the axial direction.

TABLE 2

| Angle $\theta$ and growing speed in the axial direction | |
|---|---|
| Angle $\theta$ (°) | Growing speed in the axial direction (mm/h) |
| 0 | 5–20 |
| 10 | 20–30 |
| 20 | 40–45 |
| 30 | 70–75 |
| 40 | 100 |
| 50 | 60–65 |
| 60 | 40–50 |
| 60 or more | 5 or less |

As seen from the results of the above experiments, when the angle $\theta$ is changed from 0° to 60°, the outer diameter fluctuation was minimized at $\theta = 40°$. At the same time, the growing speed in the axial direction was increased. Further, when the angle $\theta$ is in the angular range of 10° to 60°, it was found that good results were obtained with respect to the outer diameter fluctuations and the axial direction growing speed. Most preferable, at an angle within a range of 30° to 40°, the growing speed in the axial direction was increased to 70 to 100 mm/hour. A large-sized porous preform was fabricated under this desirable condition which was sufficient to manufacture a long-length optical fiber 50 to 100 km in length.

Figure 7A:
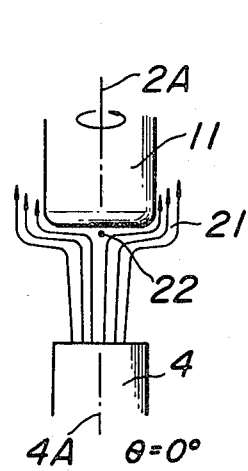
FIGS. 7A, 7B, 7C and 7D are diagrams for illustrating various aspects of glass particle streams.
Figure 7B:
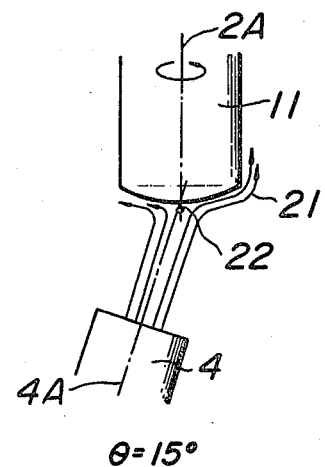
Figure 7C:
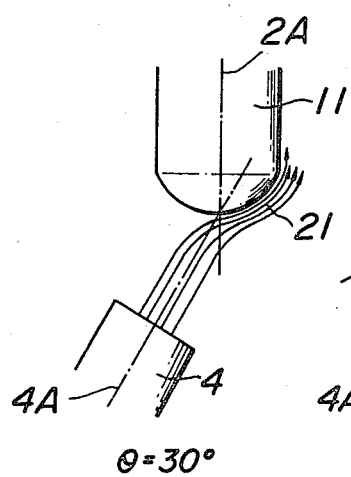
Figure 7D:
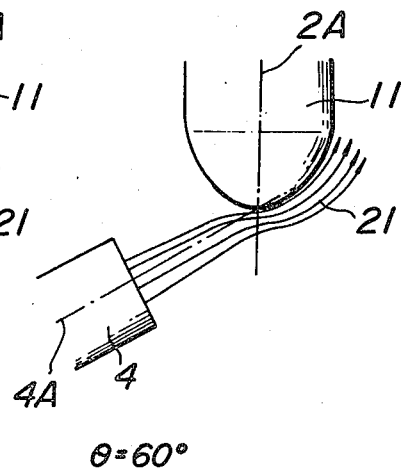

The relationship of the inclination angle θ with the growth of the porous preform will be discussed in detail hereinafter. The porous preform was grown in the stream of the glass particles by attaching and depositing the glass particles on to the porous preform. Experimental results obtained for various states of the glass particle stream when the inclination angle θ was changed are illustrated in FIGS. 7A to 7D. As shown in FIG. 7A, when θ=0°, the fine glass particle stream 21 discharged from the synthesizing torch 4 diverged in the radial direction in the vicinity of the growing surface of the porous preform 11, so that a stagnation point 22 was formed at the center of a plane where the stream diverged. Therefore, the fine glass particles at the center of the growing surface were unstably deposited to lessen the amount of deposited glass particles, with the result that the growth of the preform 11 in the axial direction 2A was unstable and the growing speed decreased. When the synthesizing torch 4 was further inclined to increase the angle θ, the states of the fine glass particle stream changed, as shown in FIGS. 7B to 7D. As seen from FIGS. 7B to 7D, when the inclination angle exceeds 30°, the stagnation point disappeared, so that the porous preform 11 grew stably, the growing speed was increased and the uniformity of the outer diameter was improved. When the inclination angle θ exceeds 60°, the amount of deposited glass particles and the growing speed were decreased.

Let us consider the relationship between the inclination angle θ and the transmission characteristic of an optical fiber. It is well known that in the VAD method, the surface temperature distribution of the porous preform plays an important role in forming the refractive index profile. The amount of $GeO_2$ content in the synthesized fine glass particles increases as the surface temperature of the preform growing surface rises and exhibits a temperature dependency as shown in FIG. 8. From this fact, it is deduced that the concentration distribution of $GeO_2$ in the preform and thus finally the refractive index profile of the porous preform can be controlled by adjusting the surface temperature distribution on the growing surface. In order to manufacture graded index type optical fibers having a wide bandwidth and low-loss by such a control method, the following three conditions are required:

(1) A surface temperature within a range of 300° C. to 800° C., as seen from FIG. 8.

(2) In order to obtain a parabolic refractive index distribution of the graded index type, the surface temperature distribution in the radial direction must be of the parabolic type.

(3) In order to reduce fluctuations of the refractive index, the isothermal line of the surface temperature distribution must be orthogonal to the rotation axis.

The above-mentioned relationships among the inclination angle θ, the surface temperature distribution and the transmission characteristic will be explained. When θ<10°, the preform growing surface is flat, as shown in FIG. 7A, and the distribution parameter of the surface temperature is apt to increase. The resultant refractive index profile easily takes a fourth power form. Further, the transmission bandwidth of the optical fiber obtained by drawing the transparent glass preform is 100 MHz.km or less. In addition, because of the presence of the stagnation point, the surface temperature distribution changes every moment and the refractive index fluctuations increase. Conversely, when θ>60°, the isothermal line excessively inclines with respect to the rotation axis of the porous preform and fails to satisfy the above-mentioned condition (3). As a result, the refractive index fluctuations and the transmission loss of the optical fiber increase. The results of measuring the refractive index distribution (distribution parameter α) of the preform, the fluctuations of the refractive index in the preform (specific refractive index difference: %), the transmission loss (dB/km) at a wave length of 0.85 μm and the transmission bandwidth (MHz.km) with respect to an inclination angle θ of the synthesizing torch 4 are tabulated in Table 3.

TABLE 3

| Refractive index and transmission characteristics with respect to inclination angle θ | | | |
|---|---|---|---|
| Inclination angle θ (°) | <10° | 10° 60° | >60° |
| Distribution parameter α | >4 | 3–1.5 | <1.5 |
| Fluctuation of refractive index (%) | 0.2–0.1 | 0.05–0.01 | 0.2–0.1 |
| Transmission loss (dB/km) | >5.0 | <3.0 | >5.0 |
| Transmission bandwidth (MHz . km) | <50 | >100 | <100 |

As seen from Table 3, in an angular range θ=10° to 60°, optical fibers with good refractive index and transmission characteristics may be manufactured.

When the angle θ is changed with fixed flow rates of the glass raw material and the combustible gas, the outer diameter d (FIG. 6) of the porous preform is also adjustable. For example, when θ=10°, d =70 mmφ and when θ20°, d =50 mmφ. Further, d=60 mmφ, when θ=60°.

As described above, the outer diameter fluctuation of the porous preform can be remarkably reduced compared to the conventional method when the synthesizing torch 4 is inclined by 10° to 60° with respect to the rotation axis of the fiber preform. As a result, there is an advantage in that the fluctuations of core-to-outer-diameter ratio, transmission loss, and bandwidth of the optical fibers obtained from the preforms thus formed are improved. Therefore, this fiber preform is effectively used for the fabrication of multi-mode optical fibers. Besides, the stabilization of the growth of the porous preform according to the invention improves the production yield and efficiency of the porous preforms. In addition, since the growing speed in the axial direction is increased, there is an advantage in that the optical fiber preform is continuously fabricated in the direction shown in FIG. 6.

Returning again to FIG. 6, the exhaust port 9 is disposed in the vicinity of the growing surface of the porous preform 11 with a distance A from the periphery of the preform 11. With this arrangement, when the distance A is selected to be in the range 1 mm to 50 mm, the outer diameter fluctuations of the porous preform which occur in the conventional method may be remarkably improved. The fine glass particle layer having a small apparent density is not formed on the periphery of the porous preform 11, thus eliminating the formation of "cracking" on the periphery of the porous preform 11. Thus, when the porous preform 11 is vitrified, it provides a stable transparent preform.

The experimental results with respect to the distance A will be described. For simplicity, a simple model shown in FIG. 9 was used in which two exhaust ports 30 and 31 were disposed in opposition to each other in the vicinity of the growing surface of the preform when the inclination angle θ=0°. For example, in FIG. 9, the distance A was 15 mm. Exhaust amounts of the residual glass fine particles 32 and 33 exhausted through the exhaust ports 30 and 31 and various kinds of undesirable gases were adjusted to be equal to blowing amounts of the fine glass particles and the flame stream 20. As a result, the fluctuation of the outer diameter of the porous preform 11 formed under this condition was limited within ±1 mm. No fine glass particle layer having a low apparent density formed by the residual fine particles 32 and 33 was observed. The transparent glass preform was fabricated in a stable manner.

Figure 9:
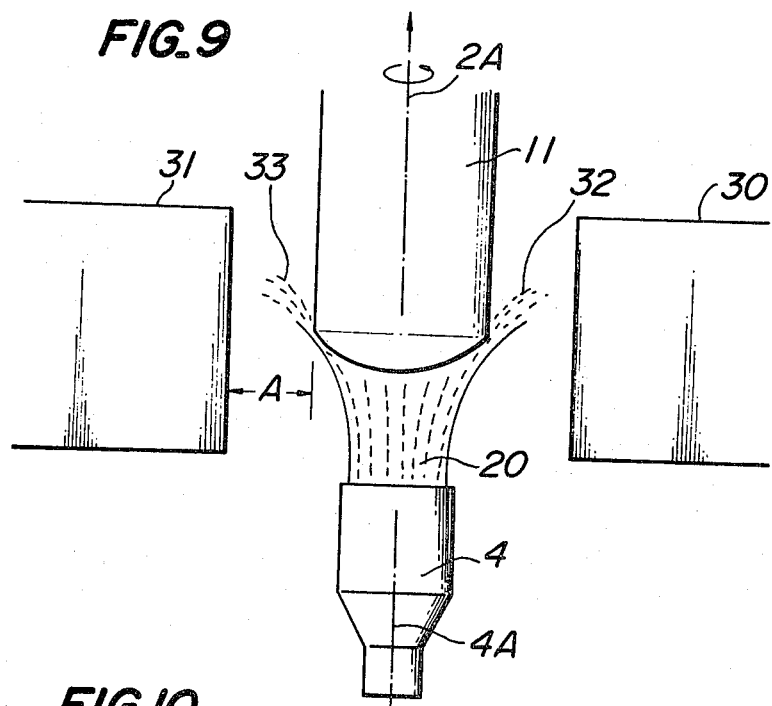
FIGS. 9 and 10 are schematic diagrams illustrating operation of two embodiments of gas blowing nozzles according to the invention.

On the other hand, when the distance A was selected to be larger than 50 mm in FIG. 9, the amounts of residual fine particles and undesired various gases exhausted from the exhaust ports 30 and 31 were lessened, so that the residual fine particles were attached to the periphery of the porous preform 11. A problem similar to that which occurs with the conventional method was observed.

When the distance A was selected to be less than 1 mm in FIG. 9, the exhaust ports 30 and 31 came in contact with the periphery of the porous preform 11 because of mechanical fluctuations of the position due to the rotation of the porous preform 11. As a result, the peripheral surface of the porous preform 11 was undulated, so that the transparent preform thus obtained was hardly usable as an optical fiber preform.

In order to further enhance the effect resulting from the provision of the exhaust port, three or more exhaust ports may be arranged at an equidistance in the vicinity of the growing surface of the porous preform 11.

Figure 10:
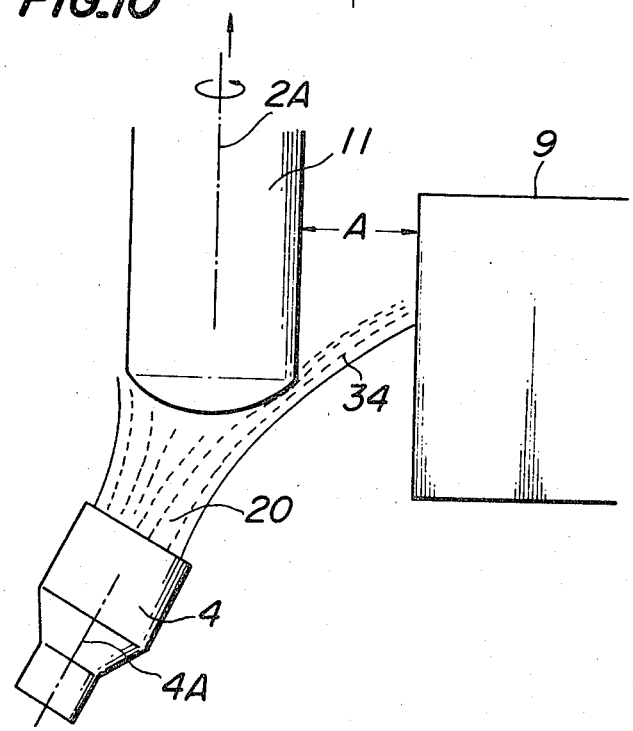

FIG. 10 shows in detail the exhaust port 9 shown in FIG. 9 and its associated portion. In this case, the residual fine particles and undesirable various gases 34 may easily be removed by merely providing a single exhaust port 9 in opposition to the synthesizing torch 4, unlike the embodiment shown in FIG. 9. Especially in this case, when the inclination angle $\theta$ was 30° to 40° and the distance A was 5 to 10 mm, the fluctuation of the outer diameter was improved to ±0.5 mm (about 1%) or less.

According to this invention, as described above, the outer diameter fluctuations of the porous preform may be considerably improved compared to the conventional method by the provision of the exhaust port or ports for exhausting the residual fine particles and the undesirable gases disposed in the vicinity of the porous preform. Further, the present invention has an advantage in that the production yield of the optical fiber preforms by the VAD method is improved, since there is no formation of "cracking" in the periphery of the porous preform.

Furthermore, as shown in FIG. 5B, there is eliminated the fine glass particle layer having a low apparent density, which is to be formed on the porous preform periphery when the conventional method is used. Accordingly, an additional fine glass particle layer as a cladding layer, for example, may be attached to and deposited on the periphery of a cylindrical porous preform once formed, by using another synthesizing torch, for example, a cladding torch, to fabricate a further thicker cylindrical porous preform, for example, a multi-mode optical fiber preform having a cladding layer formed as just mentioned rather than by a silica tube.

Figure 11:
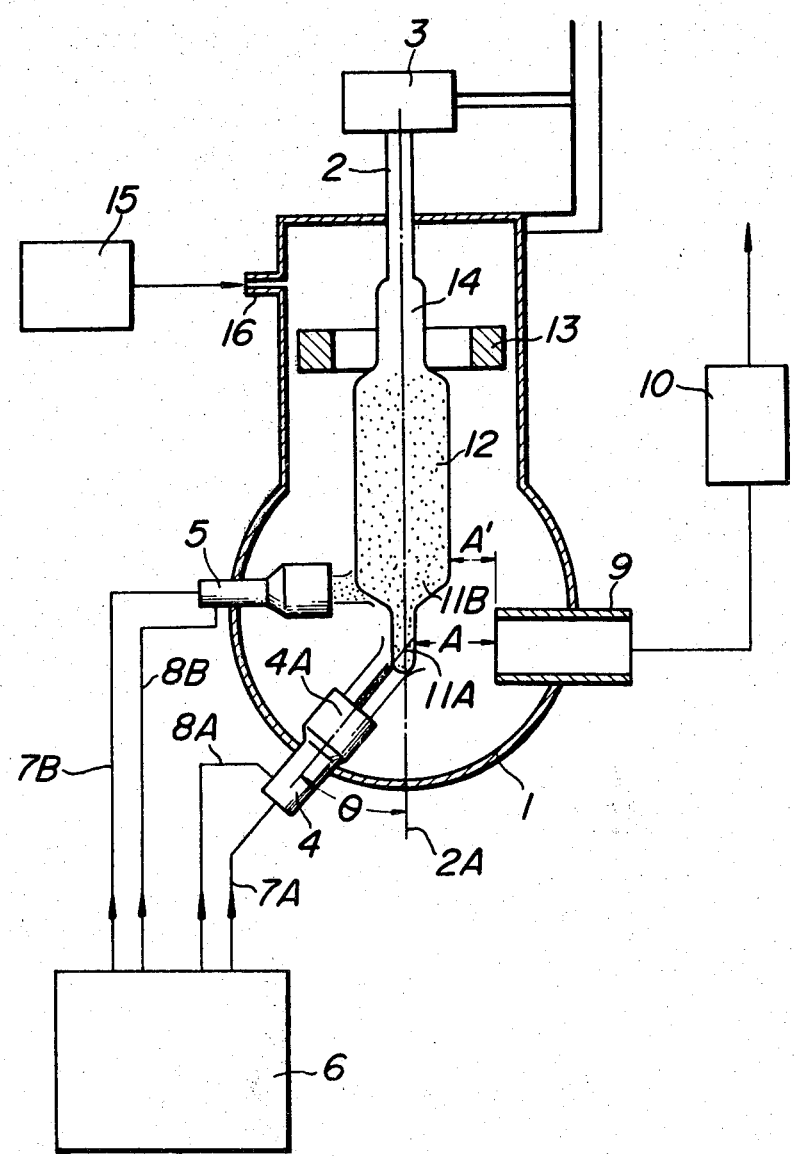
FIG. 11 is a schematic diagram showing an embodiment of an apparatus for fabricating multi-mode optical fiber preforms according to the present invention.
Figure 12:
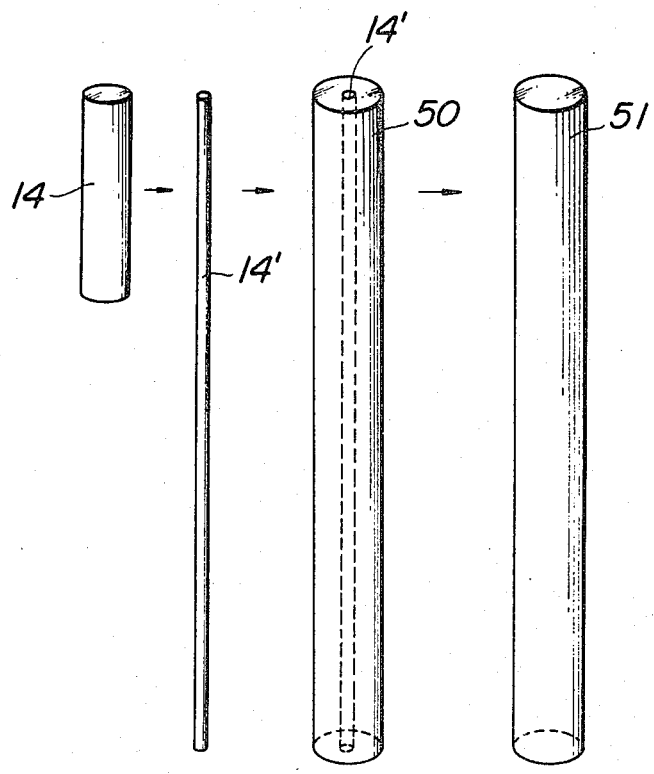
FIG. 12 is a schematic diagram for illustrating the steps of sealing a glass preform in a glass tube in accordance with the invention.

FIG. 11 shows an apparatus for fabricating a transparent preform for multi-mode optical fibers according to the present invention. FIG. 12 shows a series of steps for a process for placing a jacket on the transparent glass. In FIG. 11, reference numeral 1 designates a reaction vessel, 2 a supporting rod as a seed rod onto which a porous glass body is attached and deposited, 3 a pulling-up machine for pulling up the supporting rod 2 while rotating the rod 2, 4 a torch for the core and 5 a torch for the cladding. The torch 4 for the core is mounted on the vessel 1 with an inclination angle between $\theta \approx 10°$ and 60° with respect to the axis 2A of the supporting rod 2. It is preferable that the inclination angle be adjustable. A supplier 6 supplies to the torches 4 and 5 the glass raw material such as $SiCl_4$, $GeCl_4$, $POCl_3$ and $BBr_3$, an atmospheric gas such as Ar, He or $N_2$, a combustible gas such as $H_2$ and a subsidiary gas such as $O_2$ the latter two being generally referred to as flame forming gases. The glass raw material gas is supplied from the supplier 6 to the torches 4 and 5 through glass raw material gas pipes 7A and 7B. Various flame forming gases are supplied through flame forming gas pipes 8A and 8B to the torches 4 and 5. Reference numeral 9 designates an exhaust port attached to the reaction vessel 1. Through the exhaust port 9, gases such as $H_2O$, HCl, $Cl_2$ and so on are produced by the hydrolysis or the thermal oxidation reaction of the flames blown out from the torches 4 and 5, the non-reacted glass raw material gas such as $SiCl_4$, $GeCl_4$, $POCl_3$, $BBr_3$ or the like and the gas such as Ar, He, $N_2$ are exhausted to the exhaust gas cleaner 10 for processing.

Further, in FIG. 11, 11A designates a formed porous glass body for the core, 11B a porous glass body for the cladding (a cladding layer) deposited around the porous glass body for the core 11A, 12 a porous preform composed of the core and cladding regions, 13 a ring heater for heating the porous preform 12, which passes through the ring heater 13, at 1500° C. to 1700° C. to vitrify and consolidate the preform 12 into a transparent preform 14, 15 a supplier for supplying halogen gas for dehydration treatment such as a mixture of He and $Cl_2$ gases, and 16 a supply port for supplying the dehydration treatment gas into the reaction vessel 1.

In operation of the apparatus shown in FIG. 11, the glass raw material gas containing, for example, $SiCl_4$ as the major component and the flame forming gases are supplied to the torch 4 for the core from the supplier 6 through the pipes 7A and 8A so as to attach fine glass particles containing $SiO_2$ as the major component and $GeO_2$ and $P_2O_5$ as dopants onto an end face of the supporting rod 2. Then, the supporting rod 2 is pulled up while being rotated by the pulling-up machine 3, so that the porous preform for core 11A is grown. At the same time, the cladding torch 5 blows out fine glass particles containing only $SiO_2$ or containing $SiO_2$ as the major component and $P_2O_5$ or $B_2O_3$ around the porous preform 11A, in a manner such that these particles are deposited onto the periphery of the glass body 11A. As a result, a porous glass layer 11B for cladding is formed on the surface of the glass body 11A. The porous preform 12 composed of the core region and the cladding region thus formed is heated, for example, at 1500° C. by the vitrifying heater 13, so that a transparent preform 14 having a core glass covered with a cladding glass is formed. In the vitrifying step, the dehydration treatment gas such as a mixture of He and $Cl_2$ gases is supplied from the supply port 16 into the reaction vessel 1 to remove the OH content from the porous preform 14.

The step of placing a jacket on the transparent preform 14 thus fabricated will be described with reference to FIG. 12. As shown in FIG. 12, the transparent glass preform 14 is first stretched in conformity to the inner diameter of a silica tube 50. The stretched transparent preform 14' is inserted and sealed into the silica tube 50, so as to form a multi-mode optical fiber preform 51. The multi-mode optical fiber preform 51 is then drawn by a conventional fiber drawing machine to form a multi-mode optical fiber.

Further, as the torch for the core mentioned above, it is preferable to use a torch constructed such that the fine glass particles for the core which are produced and blown out are deviated with respect to the center area of the flame stream.

Figure 13:
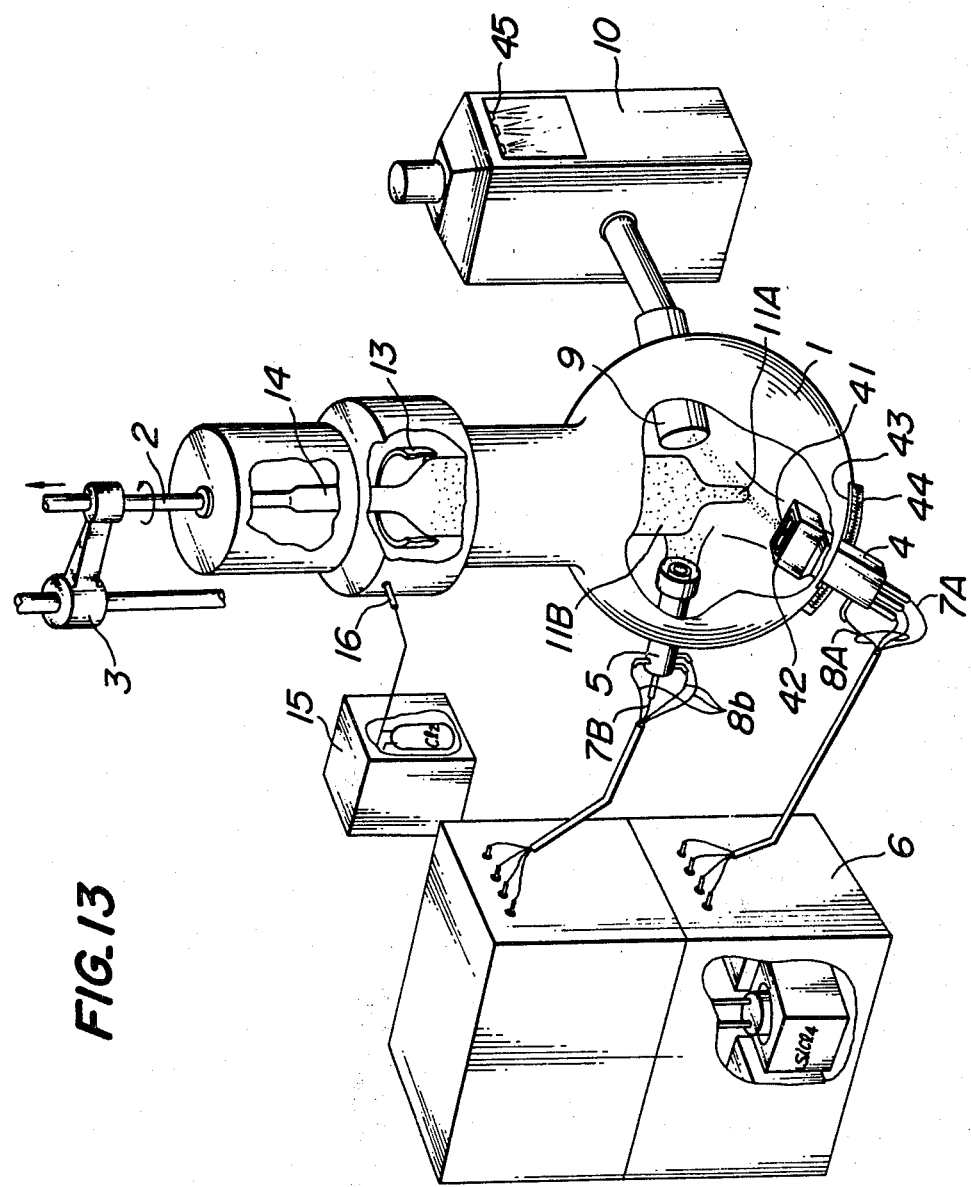
FIG. 13 is a perspective view, partially broken, showing an embodiment of an apparatus for fabricating multi-mode optical fiber preforms according to the invention.

With reference to FIG. 13, there is shown a detailed embodiment of an apparatus for fabricating the multi-mode optical fiber preform according to the invention. Like numerals are used to designate portions corresponding in those of FIG. 11. In FIG. 13, the supplier 6 for supplying the glass raw material, which is of the conventional type, measures the various gases each by a given amount and supplies the measured gases to the core torch 4 and the cladding torch 5. The core torch 4 is so arranged that its glass raw material blowing nozzle 41 is positioned at the center of the blowing nozzle 42 for the flame stream. The core torch 4 is swingable along a groove 43 of the vessel 1 in such a manner that the inclination angle $\theta$ may be set at a desired value within an angular range of 10° to 60°. The set angle $\theta$ is read by a gauge 44. The exhaust gas cleaner 10 is provided with a spray 45 for spraying water. The sprayed water converts the $Cl_2$ component contained in the exhaust gas into HCl. HCl is neutralized by NaOH. The water from the spray 45 washes away the fine glass particles and the like.

As is clear from the foregoing, the present invention has the following advantageous effects:

(1) The porous preform may be grown stably in the axial direction with small fluctuations on the order of ±1 mm of the outer diameter of the preform. Especially, when the inclination angle $\theta = 30°$ to 40° and the distance A = 5 to 10 mm, the outer diameter fluctuation is reduced to less than ±0.5 mm.

(2) When the inclination angle $\theta$ is within 10° to 60°, the growing speed in the axial direction may readily be improved. Especially, when $\theta = 30$ to 40°, the growing speed is increased to 70 to 100 mm/hour and it is easy to fabricate a long length preform corresponding to an optical fiber having a length of 50 to 100 km.

(3) The provision of the exhaust port in the vicinity of the growing surface of the preform with a distance of 1 to 50 mm from the growing surface prevents formation of a fine glass particle layer having a low apparent density on the periphery of the porous glass preform. As a result, the porous preform grows stably with a uniform outer diameter, without the formation of "cracking" in the peripheral surface of the preform.

(4) The refractive index distribution is controllable by using a temperature distribution on the growing surface of the porous preform. Accordingly, graded-index type optical fibers having a wide bandwidth and low-loss can be fabricated.

(5) A low-loss optical fiber may be manufactured by the steps of stably growing in the porous preform for the core in the axial direction with lessened fluctuations of the outer diameter and depositing the porous preform for the cladding on the preform for the core. Accordingly, by using the present invention, a low-loss multi-mode optical fiber may be fabricated.

(6) Consequently, the fabrication method according to the invention is suitable for the mass-production of long-length and low-loss multi-mode optical fibers. This results in reduction of the cost of the optical fiber. In this respect, it is expected that the present invention will contribute to the realization of a short haul optical transmission system, a subscriber optical transmission network, or the like.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. A method of fabricating a multi-mode optical fiber preform from a seed rod having an axis of rotation, comprising the steps of:

translating said seed rod along said axis of rotation while rotating said seed rod about said axis;

blowing out a glass raw material gas and a flame forming gas separately from a single synthesizing torch inclined at an inclination angle between 10° and 60° with respect to the axis of rotation of said seed rod to synthesize glass particles and then to deposit said glass particles onto one end of said seed rod so that a cylindrical porous preform is grown in the direction of said axis of rotation, said glass raw material gas including an additive material for controlling the refractive index of said preform, the inclination angle of said synthesizing torch resulting in a temperature distribution across said one end of said seed rod whereby the temperature of said one end decreases from the center toward the periphery thereof, said glass raw material gas reacting in accordance with the surface temperature of said seed rod and the concentration of said additive material in said preform to provide a predetermined refractive index profile across said preform; and heating said cylindrical porous preform at a high temperature to vitrify said cylindrical porous preform into a transparent optical fiber preform.

2. A method of fabricating a multi-mode optical fiber preform as claimed in claim 1, wherein said synthesizing torch is inclined at an angle between 30° and 40° with respect to said axis of rotation.

3. A method of fabricating a multi-mode optical fiber preform from a seed rod having an axis of rotation, comprising the steps of:

translating said seed rod along said axis of rotation while rotating said seed rod;

blowing out a glass raw material gas and a flame forming gas separately from a single synthesizing torch inclined at a predetermined inclination angle with respect to the axis of rotation to synthesize fine glass particles from said glass raw material gas through hydrolysis by flame or thermal oxidation by a high temperature heat source, said glass particles being blown out and deposited on one end of said seed rod so that a cylindrical porous preform is grown in the direction of said axis of rotation, said glass raw material gas including an additive material for controlling the refractive index of said preform, the inclination angle of said synthesizing torch resulting in a temperature distribution across said one end of said seed rod whereby the temperature of said one end decreases from the center toward the periphery thereof, said glass raw material gas reacting in accordance with the surface temperature of said seed rod and the concentration of said additive material in said preform to provide a predetermined refractive index profile across said preform;

exhausting glass particles not attached to the growing surface of said cylindrical porous preform of said glass particles, gas produced as a result of said hydrolysis or oxidation, non-reacted glass raw material gas and said flame forming gas through at least one exhaust port which is spaced from said synthesizing torch and disposed at a distance of 1 mm to 50 mm from the periphery of the cylindrical porous preform formed by the deposition of said glass particles and in the vicinity of the growing surface of said cylindrical porous preform; and heating said cylindrical porous preform at a high temperature to vitrify said cylindrical porous preform into a transparent optical fiber preform.

4. A method of fabricating a multi-mode optical fiber preform as claimed in claim 3, wherein said synthesizing torch is inclined at an angle between 10° and 60° with respect to the axis of rotation of said seed rod, so that said glass particles are obliquely blown out for deposit onto one end of said seed rod.

5. A method of fabricating a multi-mode optical fiber preform as claimed in claim 4, wherein said exhaust port is disposed opposite said synthesizing torch with respect to said cylindrical porous preform.

6. A method of fabricating a multi-mode optical fiber preform as claimed in claim 4, wherein said synthesizing torch is inclined at an angle between 30° and 40° with respect to said axis of rotation.

7. A method of fabricating a multi-mode optical fiber preform as claimed in claim 3, wherein the distance between said exhaust port and the periphery of said cylindrical porous preform is 5 mm to 10 mm.

8. A method of fabricating a multi-mode optical fiber preform as claimed in claim 7, wherein said synthesizing torch is inclined at an angle between 30° and 40° with respect to said axis of rotation.

9. A method of fabricating a multi-mode optical fiber as claimed in claim 1 or 3, wherein said cylindrical porous preform comprises the core of an optical fiber, said method comprising the further step of blowing out a glass raw material gas and a flame forming gas separately from a second synthesizing torch to form a cladding on said core.

10. A method of fabricating a multi-mode optical fiber preform from a seed rod having an axis of rotation, comprising the steps of:

translating said seed rod along said axis of rotation while rotating said seed rod about said axis;

blowing out a glass raw material gas and a flame forming gas separately from a single synthesizing torch inclined at a predetermined inclination angle with respect to the axis of rotation of said seed rod to synthesize glass particles and then to deposit said glass particles onto one end of said seed rod so that a cylindrical porous preform is grown in the direction of said axis of rotation, said glass raw material gas including an additive material for controlling the refractive index of said preform, the inclination angle of said synthesizing torch resulting in a temperature distribution across said one end of said seed rod whereby the temperature of said one end decreases from the center toward the periphery thereof, said glass raw material gas reacting in accordance with the surface temperature of said seed rod and the concentration of said additive material in said preform to provide a predetermined refractive index profile across said preform; and heating said cylindrical porous preform at a high temperature to vitrify said cylindrical porous preform into a transparent optical fiber preform.

* * * * *